United States Patent [19]

Varga

[11] Patent Number: 5,450,543
[45] Date of Patent: Sep. 12, 1995

[54] FLAG-BASED HIGH-SPEED I/O DATA TRANSFER

[75] Inventor: Gabriel Varga, Toronto, Canada

[73] Assignee: ATI Technologies Inc., Thornhill, Canada

[21] Appl. No.: 320,229

[22] Filed: Oct. 11, 1994

[51] Int. Cl.⁶ ............................................. G06F 12/00
[52] U.S. Cl. ..................................... 395/164; 395/162
[58] Field of Search ............... 395/162, 164, 166, 275, 395/325, 375, 400, 425, 800; 345/185, 186, 189, 190, 200; 365/236, 238.5

[56] References Cited

U.S. PATENT DOCUMENTS 4,347,567  8/1982  DeTar, Jr. et al. ................. 364/200
4,965,723 10/1990  Kirk et al. .......................... 364/200
5,068,785 11/1991  Sugiyama ........................... 395/325
5,369,738 11/1994  Bremner, III ...................... 395/126

*Primary Examiner*—Mark R. Powell
*Assistant Examiner*—U. Chauhan
*Attorney, Agent, or Firm*—Pascal & Associates

[57] ABSTRACT

A memory address pointer that selects a memory location that is mapped to a video graphics circuit port is incremented only when all bytes in a memory location have been read from or written to by the host CPU. This does not depend on the order in which the host CPU reads or writes data bytes. Therefore a video controller that uses the present invention will work with 8 bit, 16 bit as well as high performance 32 bit input/output instructions.

11 Claims, 1 Drawing Sheet

FLAG-BASED HIGH-SPEED I/O DATA TRANSFER

FIELD OF THE INVENTION

This invention relates to methods and means for transferring data by means of a data path such as a data bus or network, and is particularly useful in transferring data between a host central processing unit (CPU) of a personal computer and a video memory.

BACKGROUND TO THE INVENTION

In many personal computers, a host CPU transfers data from and to a video graphics memory through a port of the memory which is mapped to the input/output (I/O) port of the CPU. A video controller that controls reading from and writing to the memory contains a video memory address pointer that selects the memory location that is being mapped to the port, which pointer is automatically updated whenever the CPU accesses the I/O mapped memory port. Thus as data is read from or written to the memory, data which corresponds in width to the CPU port is read from or written to the video memory at video memory addresses that begin at new address locations pointed to by the pointer, for each successive read or write.

The host expansion bus typically transfers data at 8, 16 or 32 bits at a time, while the video memory bus is typically 32 to 64 bits in width. Therefore a protocol is used to determine when the address pointer should be incremented. In this protocol, the address pointer is incremented whenever the most significant byte is accessed by the host CPU. This relies on the assumption that during a multi-byte data transfer, the host CPU always accesses the most significant byte last, and assures that all the less significant bytes will have already been transferred when the most significant byte is accessed.

However it has been found that when executing 32 bit input/output instructions on personal computer motherboards, this convention is not always followed, i.e. the most significant byte is not the last byte accessed. For this reason, video driver programs cannot use 32 bit input/output instructions, since incorrect data can be transferred. To ensure that the instructions will be carried out with reliability, video driver programs have relied on 16 bit input/output instructions. Such instructions clearly transfer data much slower than 32 bit input/output instructions, and results in significant degradation in performance from the capability of the computer.

SUMMARY OF THE INVENTION

In a computer or other data transfer device that uses the present invention, 32 bit input/output instructions can be used, thus enhancing performance significantly over prior art devices referred to above.

In accordance with an embodiment of the present invention the memory address pointer is incremented only when all bytes in a memory location have been read from or written to by the host CPU. This does not depend on the order in which the host CPU reads or writes data bytes. Therefore a video controller that uses the present invention will work with 8 bit, 16 bit as well as high performance 32 bit input/output instructions.

The present invention uses byte-accessed flags to determine when to increment the address pointer to the next address location. One byte-accessed flag is used for each byte position of the video memory data path (e.g. a 32 bit data path has 4 flags for 8 bit bytes).

These flags are cleared (or set, if initially cleared) whenever the memory address pointer is changed to point to a new memory location.

Whenever a byte or group of bytes are accessed by the host CPU through the input/output port, flags corresponding to the number of bytes are set. The address pointer is incremented only after all byte-accessed flags have been set. This ensures that the address is incremented only when all bytes of a video memory location are accessed.

In accordance with another embodiment, a method of transferring data to or from a memory is comprised of providing a data path having a path width sufficient for carrying plural bytes of data, setting a flag related to each byte width of the data path, transferring bytes of data via the data path, resetting a flag for each byte of data transferred, and transferring further bytes of data only after all of the flags have been reset.

In accordance with another embodiment, the plural bytes of data are transferred from or to a memory via the data path, and the further bytes of data transferring step is comprised of generating a memory address pointer and applying it to the memory for reading therefrom or writing thereto when all of the flags have been reset.

In accordance with another embodiment, the memory is in a personal computer, and the data path is a memory data path connected to the memory having a width which is an integral multiple of a predetermined byte size, the transferring steps being reading or writing, by a host central processing unit via an input/output port connected to a host expansion bus in communication with the data path, at least one byte and not more than the integral multiple of bytes at one time via the data path.

In accordance with another embodiment, a digital data transfer apparatus is comprised of a data path having a path width for carrying plural bytes of data, apparatus for storing a flag associated with each byte that can be carried by the data path, and for setting or resetting a byte-associated flag upon detection of the presence of corresponding ones of the bytes, an address generator for detecting the flags, and for generating a new address when all of the flags have been stored or erased, and apparatus for applying at least one byte and not more than the plural bytes of data to the data path with the generation of the new address.

BRIEF INTRODUCTION TO THE DRAWINGS

A better understanding of the invention will be obtained by reading the description of the invention below, with reference to the following drawings, in which:

FIGURE 1 illustrates a block diagram of a preferred embodiment of the invention.

DETAILED DESCRIPTION OF THE INVENTION

Figure 1:
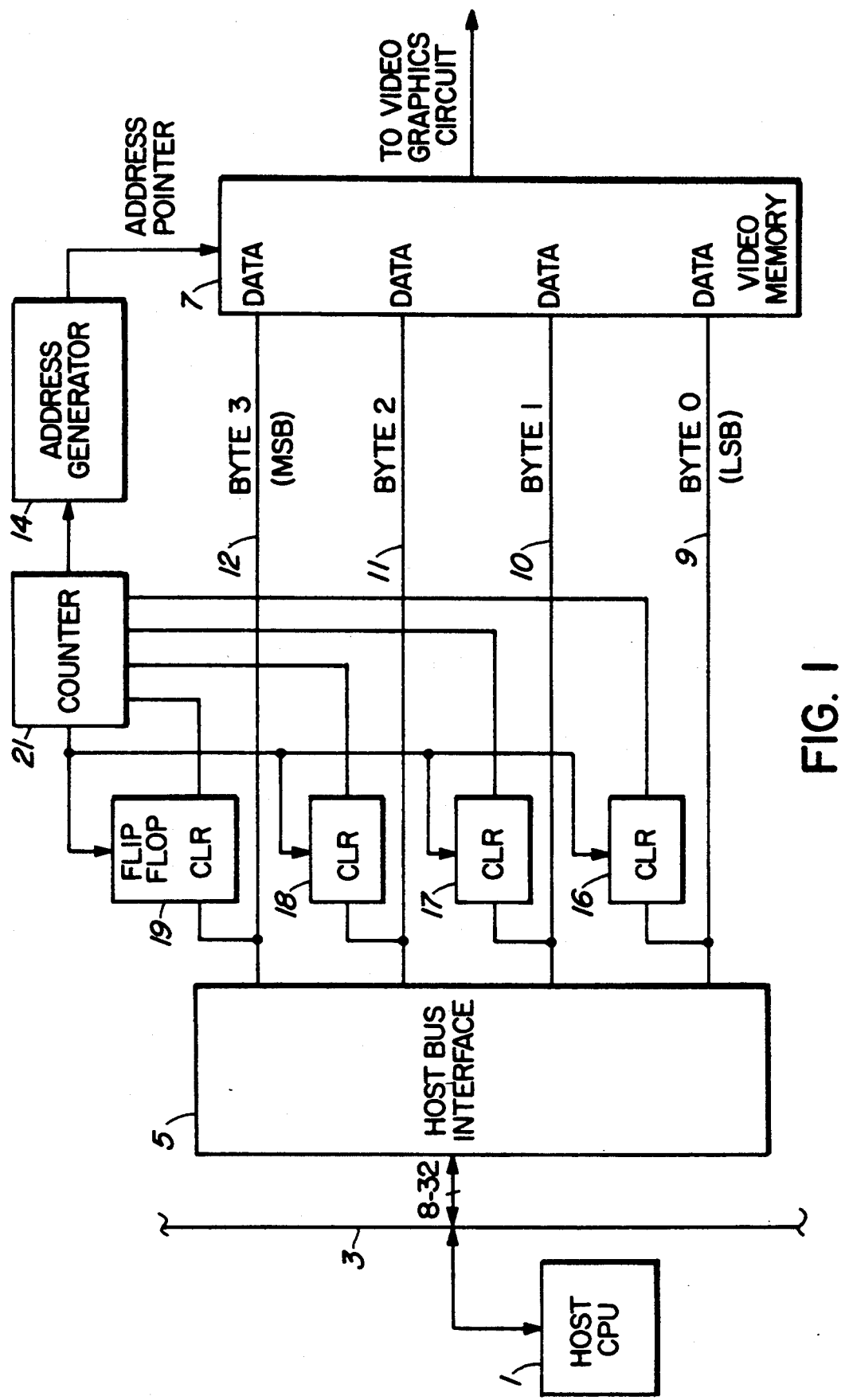

A host CPU 1 is connected to an expansion bus 3. While the bus can be an expansion bus such as an ISA or EISA, the present invention can be implemented with the CPU in communication with another bus such as a VESA or PCI bus. The bus width can be any convenient size, typically between 8 bits and 32 bits.

For the embodiment described herein, the expansion bus is connected to a host bus interface 5. The host bus interface is connected to a video memory 7 via a memory bus having the capacity of the video memory, e.g. 32 bits. In the embodiment shown, the lines of the 32 bit bus are grouped into eight-line groups 9, 10, 11 and 12. Each of the eight-line groups has the capacity to carry one 8 bit byte. The video memory is connected to a graphics controller in a well known manner.

Group 9 carries the byte 0, the least significant byte, group 10 carries byte 1, the next significant byte, group 11 carries byte 2, the next significant byte, and group 12 carries byte 3, the most significant byte.

Assuming a write operation, and assuming that the expansion bus has capacity of 32 bits (4 bytes), the host CPU transfers the 4 bytes via the host bus interface 5 to the memory bus. The host bus interface places the least significant byte on line group 9 and the most significant byte on line group 12.

An address generator 14 under control of a graphics control circuit (not shown) now generates an address pointer (or address equivalent) where the data is to be stored in video memory 7. It senses the presence of all four bytes of data, and generates a new pointer, applying this pointer to the memory. The memory uses this as an indicator of the start position for storage of the data on the memory bus, and stores the bytes at sequential locations in the memory.

When another 4 bytes of data appear on the memory bus from the host CPU, a pointer is generated in the address generator to the next sequential memory location following the space in the memory in which the 4 bytes of data are stored.

The address generator determines that all 4 bytes of data appear on the memory bus by detecting byte-associated flags, one for each byte of data. Thus for example if only one byte of data had appeared, on one of the groups of lines, there would be no indication to the address generator that all 4 bytes had been present, and no new address pointer would be generated. The one byte would be stored at the next successive byte location in the memory. In this manner each byte of each 4 byte address location in the memory will be filled before a new address pointer is incremented.

Several different structures could be used to store a flag for each byte. In the one shown in FIGURE 1, a flip flop 16, 17, 18 and 19 is associated with each group of lines 9-12, each flip flop storing a flag. When a byte of data appears on a group of lines, the corresponding flip flop is set. This is applied to a four bit counter 21. When bytes have appeared on all four groups of lines, the counter senses that all four flip-flops have been set, and it applies an enable signal to the address generator 14. It also applies a clear signal to each of the flip flops 16-19, resetting them.

If, however, for example one byte (8 bits) or two bytes (16 bits) appear on only two of the groups of lines 9-12, only two of the flip flops are set. The counter only counts to 2. Only after bytes appear on the other groups of lines the remaining flip flops are set, the counter completes its count to 4, and enables address generator 14 and resets the flip flops.

The address generator, receiving an enable signal from the counter, generates a new memory pointer to where the memory 7 can store the current data.

Reading from the memory will be readily understood by a person skilled in the art understanding the embodiment described above, wherein the data is applied to the memory bus from the memory at address locations pointed to from the address locations, instead of from the host bus interface.

Further, it will be understood that rather than the presence of flag being a set condition and its absence being a reset condition, the opposite could be the case, or the presence or absence of a binary indicator. All of these should be construed to be the equivalent.

It should be noted that other structures can provide the flag indication related to each byte. For example a bit corresponding to each byte can be stored in a flag storage location of the memory itself, and the address generator can detect the presence of all of the flags. Alternatively the address generator can store the flags, or instead of storing the flags, can store an indication, such as a count, of the existence of the flags.

Further, while a parallel bus has been described, a similar system can be used with a serial bus, whereby the a flag associated with each byte of a group of bytes making up a word is detected, and an address pointer or the equivalent incremented upon detection of the presence of all flags, rather than merely the first or last of the flags of each byte.

The present invention is not restricted to reading from or writing data to a video memory, but can be used in any application in which high performance data transfer is needed, for example across a network such as a local area network.

A person understanding this invention may now conceive of alternative structures and embodiments or variations of the above. All of those which fall within the scope of the claims appended hereto are considered to be part of the present invention.

I claim:

1. A method of transferring data to or from a memory comprising:
   (a) providing a data path having a path width sufficient for carrying plural bytes of data,
   (b) setting a flag related to each byte width of the data path,
   (c) transferring bytes of data via said data path,
   (d) resetting a flag for each byte of data transferred, and
   (e) transferring further bytes of data only after all of said flags have been reset.

2. A method as defined in claim 1 in which the plural bytes of data are transferred from or to a memory via the data path, the transferring further bytes of data step comprising generating a memory address pointer and applying it to the memory for reading therefrom or writing thereto when all of said flags have been reset.

3. A method as defined in claim 2 wherein the memory is in a personal computer, and the data path is a memory data path connected to the memory having a width which is an integral multiple of a predetermined byte size, the transferring steps being reading or writing, by a host central processing unit via an input/output port connected to a host expansion bus in communication with the data path, at least one byte and not more than said integral multiple of bytes at one time via the data path.

4. A method as defined in claim 3 in which the memory is a video memory.

5. A method as defined in claim 3 in which the data path is a data network.

6. A digital data transfer means comprising:
   (a) a data path having a path width for carrying plural bytes of data, (b) means for storing flag associated with each byte that is carried by the data path, and for setting or resetting flag upon detection of the presence of corresponding ones of said bytes, (c) an address generator for detecting said flags, and for generating a new address when all of said flags have been stored or erased, (d) means for applying at least one byte and not more than said plural bytes of data to the data path with the generation of said new address.

7. A digital data transfer means as defined in claim 6 including a memory connected to the data path, means for applying the new address to the memory, and means for reading or writing from or to the memory beginning at an address location pointed to by said new address when said new address is generated.

8. A digital data transfer means as defined in claim 7, the data path being connected via a host bus interface to an expansion bus of a personal computer to which a host central processing unit (CPU) is connected, data transfer being effected between the host CPU and the memory via an input/output port of the host CPU, the expansion bus and the data path.

9. A digital data transfer means as defined in claim 8 wherein the memory is a video memory.

10. A digital data transfer means as defined in claim 8 wherein the flag storing means is comprised of a plurality of flip flops each connected to a byte associated portion of the data path for detecting a bit of a corresponding byte and in response storing a flag, a counter connected to each flip flop for counting the number of flags stored or erased by the flip flop, the counter being connected to the address generating means for causing generation of a memory address pointer upon counting a number of flags equal to the number of bytes capacity of the data path.

11. A digital data transfer means as defined in claim 10, in which the counter is for counting the flags corresponding to the bytes carried by parallel groups of lines of the entire data path.

* * * * *